(12) United States Patent
Kaliappan et al.

(10) Patent No.: US 10,652,040 B2
(45) Date of Patent: May 12, 2020

(54) COMMON SOCIAL INTERFACE FOR SYSTEM CONTROLS

(71) Applicant: Carrier Corporation, Jupiter, FL (US)

(72) Inventors: Balaji Kaliappan, Telangana (IN); Michael Ramoutar, Westford, MA (US); Hector O. Colon, Boston, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 38 days.

(21) Appl. No.: 15/869,584

(22) Filed: Jan. 12, 2018

(65) Prior Publication Data

US 2019/0116058 A1    Apr. 18, 2019

(51) Int. Cl.
| | |
|---|---|
| *H04L 12/28* | (2006.01) |
| *G06F 3/0484* | (2013.01) |
| *H04W 4/38* | (2018.01) |
| *H04M 1/725* | (2006.01) |
| *H04L 29/08* | (2006.01) |
| *H04W 4/70* | (2018.01) |

(52) U.S. Cl.
CPC ........ *H04L 12/2827* (2013.01); *G06F 3/0484* (2013.01); *H04L 12/2816* (2013.01); *H04L 67/125* (2013.01); *H04L 67/26* (2013.01); *H04L 67/303* (2013.01); *H04M 1/72536* (2013.01); *H04W 4/38* (2018.02); *H04W 4/70* (2018.02); *H04L 2012/2841* (2013.01)

(58) Field of Classification Search
CPC ............ H04L 12/2816; H04L 12/2827; H04L 2012/2841; H04M 1/72536; H04W 4/38; G06F 3/0484
See application file for complete search history.

(56) References Cited

U.S. PATENT DOCUMENTS

| | | | |
|---|---|---|---|
| 8,978,021 B2 * | 3/2015 | DeAnna ................... | G06F 8/60 717/140 |
| 9,239,837 B2 * | 1/2016 | Chardon ............ | G06F 3/04886 |
| 9,424,007 B2 * | 8/2016 | DeAnna ................... | G06F 8/60 |
| 9,491,181 B2 | 11/2016 | Formo et al. | |
| 9,578,033 B2 | 2/2017 | Matthieu et al. | |
| 9,606,817 B1 * | 3/2017 | Efstathopoulos ....... | G06F 9/455 |

(Continued)

FOREIGN PATENT DOCUMENTS

EP    1798902 A1    6/2007

OTHER PUBLICATIONS

Atzori et al., "SIoT: Giving a Social Structure to the Internet of Things", Abstract, IEEE Commuications Letters, vol. 15, Issue 11, Nov. 2011, pp. 1-3.

(Continued)

*Primary Examiner* — Asad M Nawaz
*Assistant Examiner* — Thomas R Cairns
(74) *Attorney, Agent, or Firm* — Cantor Colburn LLP

(57) ABSTRACT

Methods, systems, and computer program products for interfacing system controls are provided. Aspects include receiving, by a processor, object data for a plurality of objects. An object profile is generated for each of the plurality of objects based at least in part on the object data and one or more communication platforms are accessed. The object profiles for each of the plurality of objects are registered with the one or more communication platforms.

12 Claims, 3 Drawing Sheets

(56) References Cited

U.S. PATENT DOCUMENTS

| | | | |
|---|---|---|---|
| 9,830,808 B2* | 11/2017 | Selfe | G08C 17/02 |
| 9,871,865 B2* | 1/2018 | Shaashua | H04W 4/70 |
| 9,900,171 B2* | 2/2018 | Guedalia | H04L 67/16 |
| 9,911,321 B2* | 3/2018 | Selfe | G08C 17/02 |
| 9,996,069 B2* | 6/2018 | Wheeler | G05B 19/0426 |
| 10,003,855 B2* | 6/2018 | Hardt | H04N 21/40 |
| 10,057,934 B2* | 8/2018 | Mathias | G06F 3/04812 |
| 2003/0078979 A1 | 4/2003 | Sagi | |
| 2004/0103153 A1 | 5/2004 | Chang et al. | |
| 2014/0244768 A1 | 8/2014 | Shuman et al. | |
| 2015/0113059 A1 | 4/2015 | Lyons | |
| 2016/0105292 A1 | 4/2016 | Choi et al. | |
| 2016/0255186 A1 | 9/2016 | Kaneblai Martins Costa et al. | |
| 2016/0371971 A1* | 12/2016 | Pasztor | H04N 21/25875 |
| 2017/0131863 A1* | 5/2017 | Wheeler | G06F 3/0484 |
| 2017/0345420 A1* | 11/2017 | Barnett, Jr. | G06F 3/167 |
| 2018/0054490 A1* | 2/2018 | Wadhwa | G06F 9/45558 |
| 2018/0267624 A1* | 9/2018 | Hemes | G06F 3/0346 |
| 2018/0349962 A1* | 12/2018 | Adderly | G06Q 30/0269 |
| 2019/0098089 A1* | 3/2019 | Shim | H04L 67/12 |
| 2019/0104191 A1* | 4/2019 | Lonij | H04L 67/26 |

OTHER PUBLICATIONS

Choi et al., "Connect with Things through Instant Messaging", Abstact, pp. 1-5, retrieved Aug. 30, 2017, retrieved from https://link.springer.com/chapter/10.1007/978-3-540-78731-0_18.

Digital Service Cloud, "A Univeral User Interface for the Internet of Things", 2015, pp. 1-10.

Gardenfors, Dan "All or Nothing? User interfaces for the Internet of Things", pp. 1-6, retrieved Aug. 30, 2017, retrieved from https://medium.com/the-conference/all-or-nothing-interfaces-for-the-internet-of-things-15b64bd04ae3.

Iera, Antonio "Convergence of IoT and Social Networks Issues", 2014 IEEE Signal Processing Society Summer School on "Internet of Things and Machine-to-Machine Systems", Aug. 26-29, 2014, pp. 1-67.

Kar et al., "Applying Chatbots to the Internet of Things: Opportunities and Architectural Elements", International Journal of Advanced Computer Science and Applications, vol. 7, No. 11, 2016, pp. 147-154.

\* cited by examiner

COMMON SOCIAL INTERFACE FOR SYSTEM CONTROLS

FOREIGN PRIORITY

This application claims priority to Indian Patent Application No. 201711036858 filed Oct. 17, 2017, the entire contents of which is incorporated herein by reference.

BACKGROUND

Exemplary embodiments pertain to the art of system controls and more particularly to common social interfaces for system controls and social internet of things (IoTs).

Control panels and systems have various user interfaces (UIs). An example control system is a mobile application or app. As more products require users to use a specific app to utilize the specific product, users may end up having multiple mobile applications based on the types of products and systems that they utilize. Instead of having multiple different types of user interface that a user has to learn, the various user interfaces may be transferred into a context with which a user may be familiar.

BRIEF DESCRIPTION

According to one embodiment, a method is provided. The method may include receiving, by a processor, object data for a plurality of objects. An object profile is generated for each of the plurality of objects based at least in part on the object data and one or more communication platforms are accessed. The object profiles for each of the plurality of objects are registered with the one or more communication platforms.

In addition to one or more of the features described above, or as an alternative, further embodiments of the method may include monitoring the plurality of objects to determine a status for each of the plurality of objects. A message is generated based at least in part on the status for each of the plurality of objects and the message is sent through the one or more communication platforms to a user of the one or more communication platforms.

In addition to one or more of the features described above, or as an alternative, further embodiments of the method may include receiving an alert from at least one of the plurality of objects. An alert message is generated based at least in part on the alert and the alert message is sent through the one or more communication platforms to a user of the one or more communication platforms.

In addition to one or more of the features described above, or as an alternative, further embodiments of the method may include that the alert message is private to the user.

In addition to one or more of the features described above, or as an alternative, further embodiments of the method may include that the generating the alert message is configured to be posted in a public forum in the one or more communication platforms.

In addition to one or more of the features described above, or as an alternative, further embodiments of the method may include receiving, from the one or more communication platforms, user data from a user and based at least in part on the user data, adjusting a setting for at least one of the plurality of objects.

According to one embodiment, a system is provided. The system may include a processor communicatively coupled to a memory. The processor may be configured to receive object data for a plurality of objects. An object profile is generated for each of the plurality of objects based at least in part on the object data and one or more communication platforms are accessed. The object profiles for each of the plurality of objects are registered with the one or more communication platforms.

In addition to one or more of the features described above, or as an alternative, further embodiments of the system may include monitoring the plurality of objects to determine a status for each of the plurality of objects. A message is generated based at least in part on the status for each of the plurality of objects and the message is sent through the one or more communication platforms to a user of the one or more communication platforms.

In addition to one or more of the features described above, or as an alternative, further embodiments of the system may include receiving an alert from at least one of the plurality of objects. An alert message is generated based at least in part on the alert and the alert message is sent through the one or more communication platforms to a user of the one or more communication platforms.

In addition to one or more of the features described above, or as an alternative, further embodiments of the system may include that the alert message is private to the user.

In addition to one or more of the features described above, or as an alternative, further embodiments of the system may include that the generating the alert message is configured to be posted in a public forum in the one or more communication platforms In addition to one or more of the features described above, or as an alternative, further embodiments of the system may include receiving, from the one or more communication platforms, user data from a user and based at least in part on the user data, adjusting a setting for at least one of the plurality of objects.

According to one embodiment, a computer program product is provided. The computer program product may include a non-transitory computer-readable storage medium, the computer program product including instructions for causing a processor to implement a method for interfacing system controls, the method may include receiving, by a processor, object data for a plurality of objects. An object profile is generated for each of the plurality of objects based at least in part on the object data and one or more communication platforms are accessed. The object profiles for each of the plurality of objects are registered with the one or more communication platforms.

In addition to one or more of the features described above, or as an alternative, further embodiments of the computer program product may include monitoring the plurality of objects to determine a status for each of the plurality of objects. A message is generated based at least in part on the status for each of the plurality of objects and the message is sent through the one or more communication platforms to a user of the one or more communication platforms.

In addition to one or more of the features described above, or as an alternative, further embodiments of the computer program product may include receiving an alert from at least one of the plurality of objects. An alert message is generated based at least in part on the alert and the alert message is sent through the one or more communication platforms to a user of the one or more communication platforms.

In addition to one or more of the features described above, or as an alternative, further embodiments of the computer program product may include that the alert message is private to the user.

In addition to one or more of the features described above, or as an alternative, further embodiments of the computer program product may include that the generating the alert message is configured to be posted in a public forum in the one or more communication platforms.

In addition to one or more of the features described above, or as an alternative, further embodiments of the computer program product may include receiving, from the one or more communication platforms, user data from a user and based at least in part on the user data, adjusting a setting for at least one of the plurality of objects.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
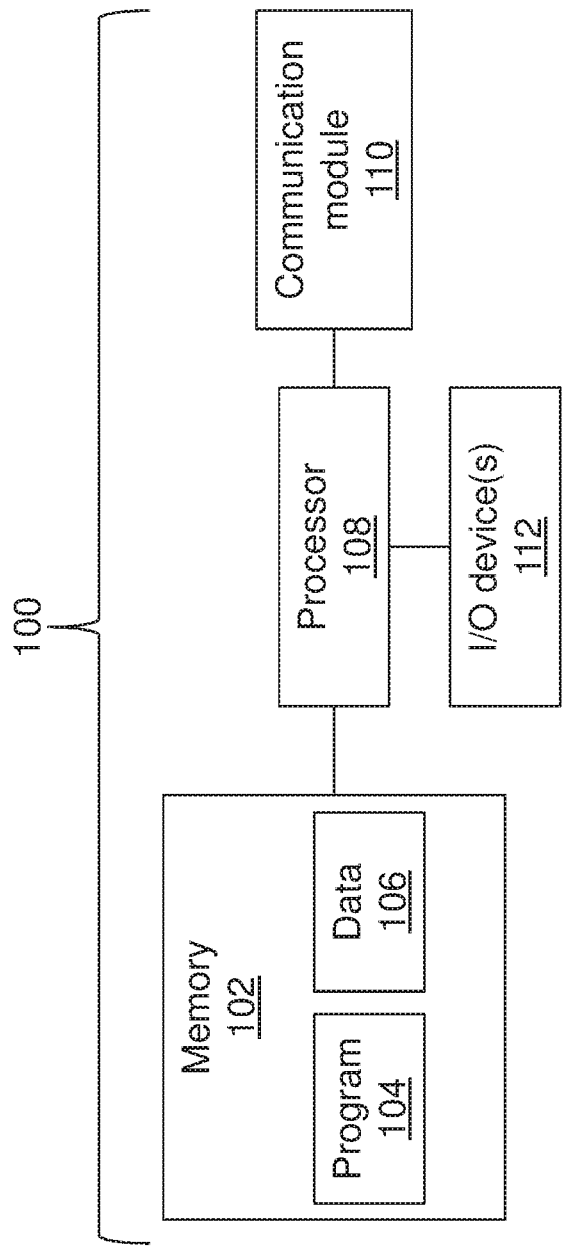
FIG. 1 is a schematic illustration of a computing system in accordance with an embodiment of the present disclosure.

Smart technology devices such as internet of things (IoT) objects have been incorporated in every day systems to connect otherwise electronically isolated objects or devices to either other IoT objects or to the internet. For example, an alarm system (i.e., IoT object) may be wired to a local internet connection to communicate with other devices, such as, for example, a smart phone or tablet for a user of the alarm system. The alarm system may utilize a mobile application (APP) that would need to be installed on the smart phone or tablet to allow for interaction with the controls of the alarm system. The mobile application is, typically, unique to the IoT object causing a user with multiple IoT objects to download and install multiple mobile applications for each of their IoT objects. In addition, certain types of IoT objects, such as a fire alarm system or elevator control system, may be tied to a building and not to a specific user living space.

The term Internet of Things (IoT) object is used herein to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT objects may include, but are not limited to, refrigerators, toasters, ovens, microwaves, freezers, dishwashers, dishes, hand tools, clothes washers, clothes dryers, furnaces, heating, ventilation, air conditioning & refrigeration (HVACR) systems, air conditioners, thermostats, fire alarm & protection system, fire, smoke & CO detectors, access/video security system, elevator and escalator systems, burner and boiler controls, building management controls, televisions, light fixtures, vacuum cleaners, sprinklers, electricity meters, gas meters, etc., so long as the devices are equipped with an addressable communications interface for communicating with the IoT network. IoT objects may also include cell phones, desktop computers, laptop computers, tablet computers, personal digital assistants (PDAs), etc. Accordingly, the IoT network can include a combination of "legacy" Internet-accessible devices (e.g., laptop or desktop computers, cell phones, etc.) in addition to devices that do not typically have Internet-connectivity (e.g., dishwashers, etc.).

The methods and systems presented herein according to one or more embodiments provide a consistent user interface for users of various IoT objects by transferring the interface from the unique mobile applications to a context that is familiar to the user such as, for example, messaging and social media platforms.

Referring now to FIG. 1, schematic block diagram illustrations of example computing system 100 is shown. The computing system 100 may be representative of computing elements or components of user devices, IoT objects, networked elements, mobile devices, etc. as employed in embodiments of the present disclosure. The computing system 100 can be configured to operate an IoT object including, but not limited to, operating and controlling a touch-screen display to display various output and receive various inputs.

As shown, the computing system 100 includes a memory 102 which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown as being associated with a program 104. The memory 102 can include RAM and/or ROM and can store the program 104 thereon, wherein the program 104 may be an operating system and/or applications to be used on an IoT object.

Further, the memory 102 may store data 106. The data 106 may include profile or registration data (e.g., in an IoT object), an IoT object identifier, or any other type(s) of data regarding a status or commands for an IoT object. The executable instructions stored in the memory 102 may be executed by one or more processors, such as a processor 108, which may be a processor in an IoT object. The processor 108 may be operative on the data 106 and/or configured to execute the program 104. In some embodiments, the executable instructions can be performed using a combination of the processor 108 and remote resources (e.g., data and/or programs stored in the cloud (e.g., remote devices)).

The processor 108 may be coupled to one or more input/output (I/O) devices 112. In some embodiments, the I/O device(s) 112 may include one or more of a physical keyboard or keypad, a touchscreen or touch panel, a display screen, a microphone, a speaker, a mouse, a button, e.g., parts or features of a telephone or mobile device (e.g., a smartphone). For example, the I/O device(s) 112 may be configured to provide an interface to allow a user to interact with the user device. In some embodiments, the I/O device (s) 112 may support a graphical user interface (GUI) and/or voice-to-text capabilities for the IoT object.

The components of the computing system 100 may be operably and/or communicably connected by one or more buses. The computing system 100 may further include other features or components as known in the art. For example, the computing system 100 may include one or more communication modules 110, e.g., transceivers and/or devices configured to receive information or data from sources external to the computing system 100. In one non-limiting embodiments, the communication modules 110 of an IoT object can include a near-field communication chip (e.g., Bluetooth®, Wi-Fi, etc.) and a cellular data chip, as known in the art. In some embodiments, the computing system 100 may be configured to receive information over a network (wired or wireless). The information received over the network may be stored in the memory 102 (e.g., as data 106) and/or may be processed and/or employed by one or more programs or applications (e.g., program 104). The computing systems 100 may be used to execute or perform embodiments and/or processes described herein, such as within and/or on an IoT object.

Figure 2:
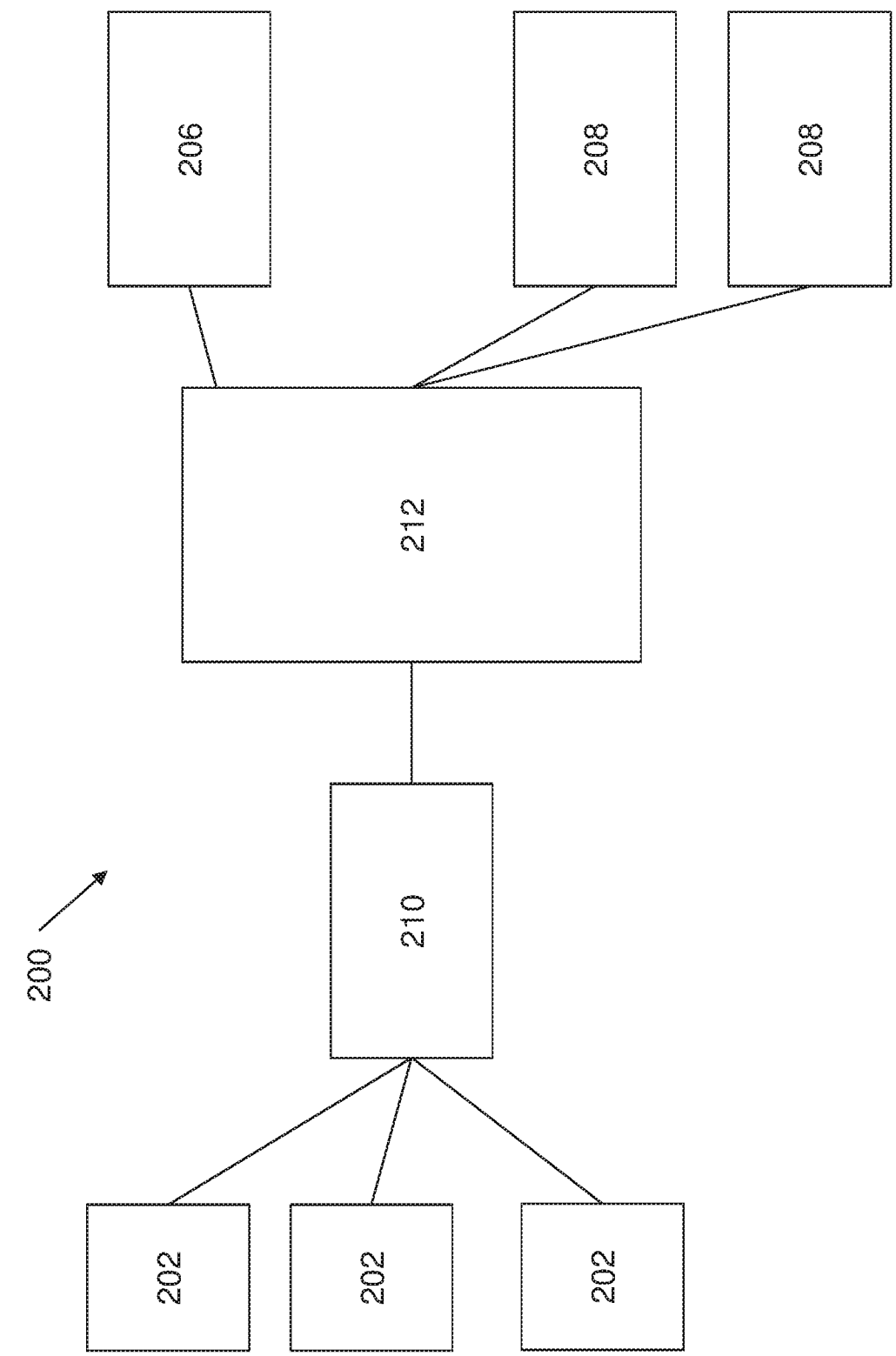
FIG. 2 is a block diagram of a system for a common social interface for system controls in accordance with an embodiment of the present disclosure.

FIG. 2 depicts a block diagram of a system for a common social interface for system controls according to one or more embodiments of the present disclosure. The system 200 includes one or more IoT objects 202. The system 200 also includes a user device 206, and one or more other devices 208, a controller 210, and a communication platform 212.

In one or more embodiments, the IoT object(s) 202 can be stand-alone devices such as, for example, a fire alarm system, HVAC system, elevator system, dishwasher, refrigerator, or oven. Or the IoT object(s) 202 can be a control system that is in electronic communication with one or more sensors or other IoT devices 202 such as, for example, a security alarm system or an elevator control system. The IoT objects 202 can connect to an internet and/or intranet to communicate with the controller 210. The controller 210 can be any type of hardware device such as the computing system 100 from FIG. 1. The controller 210 can be local to the IoT objects 202 or can be located on a server that is in electronic communication with the IoT objects 202. The controller 210 is configured to receive data for each of the IoT objects 202. The data received from the IoT objects 202 can include status data regarding the IoT objects 202, alert data regarding any abnormal or pre-programmed conditions, system identification data for the IoT objects 202, and the like. The controller 210 is configured to generate an object profile for each of the IoT objects from the data received. The controller 210 can then access and register each of the IoT objects with a communication platform 212. The communication platform 212 can be any type of messaging service, social media service, and the like. The object profiles can be registered as a contact, connection, or the like with the communication platform 212 for a user of the of the communication platform 212. Once registered, the controller 210 can monitor and/or received data regarding any of the IoT objects 202 or a control system 204 and then generate messages in a format consistent with the communication platform 212 and send these messages through the communication platform 212 to a user and/or a designated person. For example, a user may wish to have his or her home security system as well as his or her home lighting system registered with a social media platform utilized by the user. The controller 210 would add (register) the security system (i.e., IoT object) and the lighting system with the social media platform as a connection or contact for the user. Based on the type of status data received by the controller 210 a message would be generated and sent as a post, direct message, or the like to the user depending on the user's preferences. The messages can also be sent to one or more other designated individual such as a friend or family member who is also registered with the social network. For example, in the event that the security system indicates that a break-in has occurred, the message sent to the user can also be forwarded to a neighbor or family member of the user to increase awareness of the event.

In one or more embodiments, the user can send a message or command through their user device 206 to an IoT object 202. The user can generate the message through the communication platform 212 which sends the message to the IoT object 202 through the controller 210. The controller 210 is configured to receive and recognize the message/command and provide the command to the IoT object 202 that is specified by the user. For example, a user may wish to send a command to the user's thermostat to lower the temperature at the user's home. The lower temperature command is generated within a social media or messaging platform by the user. The user would select the thermostat which is registered as a connection or contact in the user's social media contact list or messaging list. Once selected, the user sends the command through the communication platform 212 which is received by the controller 210. The controller 210, based on the selection of the specific contact/connection, then communicates with the IoT object 202 (i.e., thermostat) to deliver the command in a format recognized by the IoT object 202. The IoT object 202 would execute the command. In the example, the thermostat would lower the temperature based on the command received from the controller 210.

In one or more embodiments, the controller 210 can generate messages that can be sent to a group of users on a communication platform 212 and also automatically send commands to other IoT objects 202 based on status changes from an IoT object 202. For example, an apartment building can have a fire alarm system and an elevator control system that can be in communication with the controller 210. The controller 210, in the event of an alert from the fire alarm system, could generate messages to a group of users in the apartment building to direct the flow of the group of users to specific locations to gain access to an elevator, for example. The elevator system can send an elevator car to a specific floor, as directed by the controller 210, to pick up the group of users based on the fire alarm alert sent by the controller 210. The controller 210 can direct the elevator system by sending messages through the communication platform 212 as a connection or contact of the fire alarm system. This message or posting can also copy the group of users to notify the users as to the location of an elevator car for evacuation. The controller 210 can also receive messages from users and update the elevator system accordingly, as described above, to adjust for a user that may not be present in the building. For example, a user may receive a message regarding an evacuation of a building due to a fire alarm. The user can send a message to the controller through the communication platform 212 to notify the controller 210 that the user is not present in the building and there is no need to further direct the user to an escape route. The controller 210 can still send status updates to the user regarding the fire alarm. In another embodiment, the user's device 206 can include a global positioning system (GPS) that can share location of the user device 206 and the user with the communication platform 212 which the controller 210 can utilize to either direct the user to an escape route or can recognize the user is not present in the building and send status information instead of escape route information.

In one or more embodiments, a service technician be added as a contact or connection on the communication platform 212 and connected to a specific IoT object 202. When the status of an IoT object 202 changes to a status indicating a need for servicing, the controller 210 can send a message to the service technician, to the user, or to both the user and the service technician. The service technician can have GPS enabled on his or her device and can be directed to the IoT object 202 in need of service by the controller 210 through the communication platform 212.

In one or more embodiments, a contacts group or distribution list can be added as a contact on the communication platform 212 and on specific conditions, the broadcasting of the messages can be automatically sent to the added or configured groups or distribution lists. The group of contacts can be the adjacent building system group or targeted users group or fire brigade groups or any other. Situations like a fire event or a security event, can send a message to these contact groups or distribution lists, which can trigger alerts and proactive action to those groups. The communication platform can send videos or pictures from the video security system or users can post live videos or pictures, which can be sent to the configured contact groups or distribution list, to create better awareness of the event and situation to the targeted configured group, and such targeted group can be fire brigades in the city, police departments or any such agency. Looking at the video and pictures dynamically, will allow the departments or agencies to understand the magnitude of the situation to take necessary steps.

Figure 3:
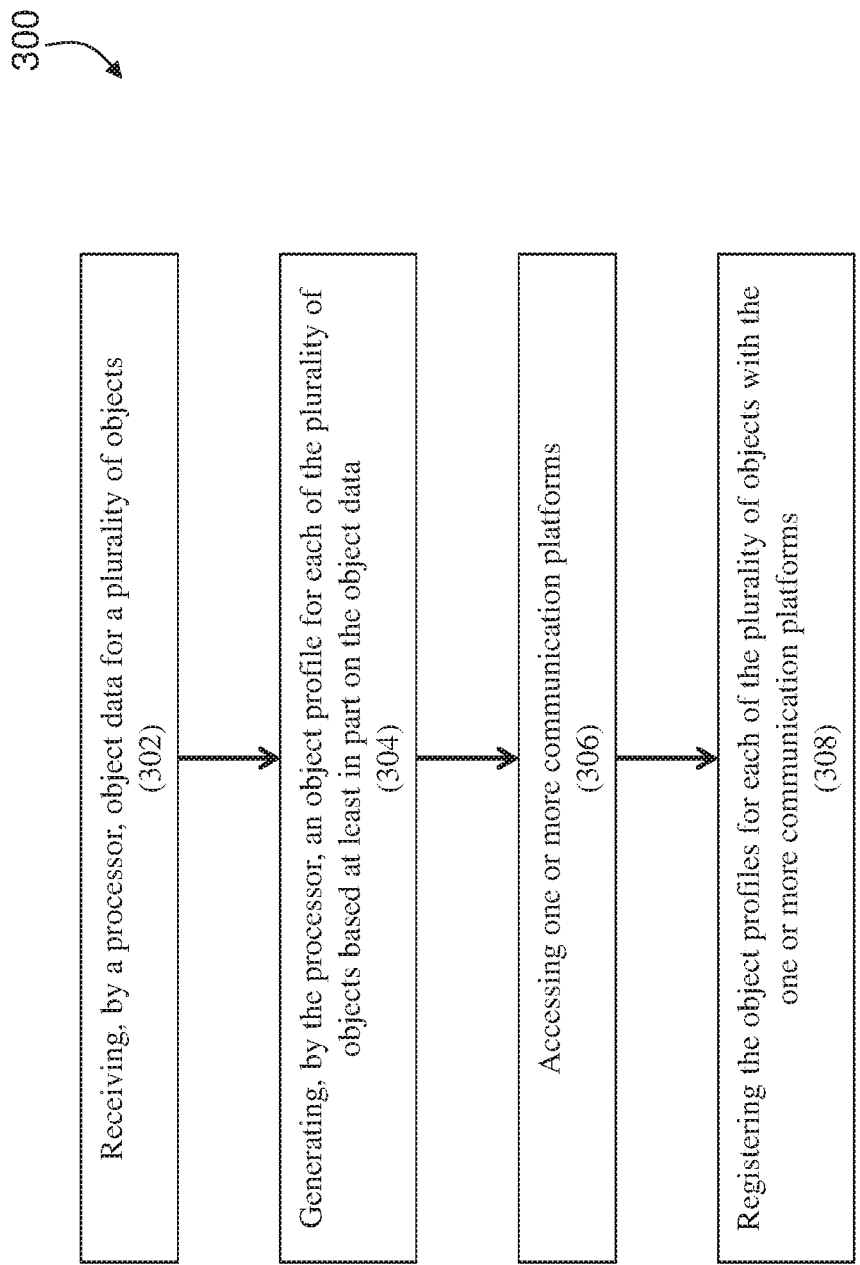
FIG. 3 is a flow diagram of a method for a common social interface for system controls in accordance with an embodiment of the present disclosure.

FIG. 3 depicts a block diagram of a method for a common social interface for system controls according to one or more embodiments of the present disclosure. The method 300 includes receiving, by a processor, object data for a plurality of objects, as shown in block 302. As described above, the objects include IoT objects that can include individual stand-alone devices, such as refrigerators or washing machines. While other IoT objects can include control systems such as fire alarm systems and security systems that can receive data from various sensors. An object profile is generated for each of the plurality of objects based at least in part on the object data, as shown in block 304. The object profile can be any of a contact card, social media profile that is formatted for input in to a communication platform. The method 300, at block 306, also includes accessing one or more communication platforms and, at block 308, registering the object profiles for each of the plurality of objects with the one or more communication platforms. As discussed above, registration can include adding the object to a contact list in a messaging platform or adding the object to as a connection to the user in a social media platform.

Additional processes may also be included. It should be understood that the processes depicted in FIG. 3 represent illustrations, and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for interfacing system controls, the method comprising:
receiving, by a processor, object data for a plurality of objects associated with a user;
generating, by the processor, an object profile for each of the plurality of objects based at least in part on the object data, wherein the object profile is configured as a social media profile for one or more social media platforms;
accessing the one or more social media platforms;
registering the object profiles for each of the plurality of objects as a social media profile for the one or more social media platforms;
monitoring the plurality of objects to determine a status for each of the plurality of objects;
broadcasting a message to an individual other than the user based at least in part on the status for each of the plurality of objects;
sending a status message through an application of the one or more social media platforms to a user profile for the user of the one or more social media platforms, wherein the user profile is distinct from the object profiles;
receiving, from the one or more social media platforms, user data from a user; and
based at least in part on the user data, adjusting a setting for at least one of the plurality of objects.

2. The method of claim 1 further comprising:
receiving an alert from at least one of the plurality of objects;
generating an alert message based at least in part on the alert;
sending the alert message through the one or more social media platforms to the user of the one or more social media platforms.

3. The method of claim 2, wherein the alert message is private to the user.

4. The method of claim 2, wherein the generating the alert message is configured to be posted in a public forum in the one or more social media platforms.

5. A system for interfacing system controls, the system comprising:

a processor communicatively coupled to a memory, the processor configured to:
- receive object data for a plurality of objects associated with a user;
- generate an object profile for each of the plurality of objects based at least in part on the object data, wherein the object profile is configured as a social media profile for one or more social media platforms;
- access the one or more social media platforms;
- register the object profiles for each of the plurality of objects as a social media profile for the one or more social media platforms;
- monitor the plurality of objects to determine a status for each of the plurality of objects;
- broadcast a message to an individual other than the user based at least in part on the status for each of the plurality of objects;
- send a status message through an application of the one or more social media platforms to a user profile for a user of the one or more social media platforms, wherein the user profile is distinct from the object profiles;
- receive, from the one or more social media platforms, user data from a user; and
- based at least in part on the user data, adjust a setting for at least one of the plurality of objects.

6. The system of claim 5, wherein the processor is further configured to:
- receive an alert from at least one of the plurality of objects;
- generate an alert message based at least in part on the alert;
- send the alert message through the one or more social media platforms to athe user of the one or more social media platforms.

7. The system of claim 6, where the alert message is private to the user.

8. The system of claim 6, where the generating the alert message is configured to be posted in a public forum in the one or more social media platforms.

9. A computer program product comprising a non-transitory computer-readable storage medium, the computer program product including instructions for causing a processor to implement a method for interfacing system controls, the method comprising:
- receiving, by the processor, object data for a plurality of objects;
- generating, by the processor, an object profile for each of the plurality of objects based at least in part on the object data, wherein the object profile is configured as a social media profile for one or more social media platforms;
- accessing the one or more social media platforms; and
- registering the object profiles for each of the plurality of objects as a social media profile for the one or more social media platforms;
- monitoring the plurality of objects to determine a status for each of the plurality of objects;
- generating a message based at least in part on the status for each of the plurality of objects;
- sending the message through an application of the one or more social media platforms to a user profile for a user of the one or more social media platforms, wherein the user profile is distinct from the object profiles;
- receiving, from the one or more social media platforms, user data from a user; and
- based at least in part on the user data, adjusting a setting for at least one of the plurality of objects.

10. The computer program product of claim 9 further comprising:
- receiving an alert from at least one of the plurality of objects;
- generating an alert message based at least in part on the alert;
- sending the alert message through the one or more social media platforms to the user of the one or more social media platforms.

11. The computer program product of claim 10, where the alert message is private to the user.

12. The computer program product of claim 10, where the generating the alert message is configured to be posted in a public forum in the one or more social media platforms.

* * * * *